United States Patent
Park et al.

(10) Patent No.: US 11,611,078 B2
(45) Date of Patent: Mar. 21, 2023

(54) POSITIVE ELECTRODE ACTIVE MATERIAL FOR LITHIUM SECONDARY BATTERY, COMPRISING LITHIUM COBALT OXIDE FOR HIGH VOLTAGE, AND METHOD FOR PREPARING SAME

(71) Applicant: LG Chem, Ltd., Seoul (KR)

(72) Inventors: Sung Bin Park, Daejeon (KR); Young Uk Park, Daejeon (KR); Ji Young Park, Daejeon (KR); Bo Ram Lee, Daejeon (KR); Chi Ho Jo, Daejeon (KR); Young Cheol Choi, Daejeon (KR); Hyuck Hur, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/341,950

(22) Filed: Jun. 8, 2021

(65) Prior Publication Data
US 2021/0296647 A1 Sep. 23, 2021

Related U.S. Application Data

(62) Division of application No. 16/070,588, filed as application No. PCT/KR2017/007599 on Jul. 14, 2017, now Pat. No. 11,081,695.

(30) Foreign Application Priority Data

Sep. 12, 2016 (KR) .................. 10-2016-0116951

(51) Int. Cl.
*H01M 4/525* (2010.01)
*H01M 4/04* (2006.01)
(Continued)

(52) U.S. Cl.
CPC ............ *H01M 4/525* (2013.01); *C01G 51/00* (2013.01); *H01M 4/0471* (2013.01);
(Continued)

(58) Field of Classification Search
None
See application file for complete search history.

(56) References Cited

U.S. PATENT DOCUMENTS 5,910,382 A 6/1999 Goodenough et al.
7,807,298 B2 * 10/2010 Takeuchi ............... C01G 51/44
429/223
(Continued)

FOREIGN PATENT DOCUMENTS

CN 103380529 A 10/2013
CN 105247715 A 1/2016
(Continued)

OTHER PUBLICATIONS

International Search Report for PCT/KR2017/007599 dated Dec. 13, 2017.
(Continued)

*Primary Examiner* — Alix E Eggerding
(74) *Attorney, Agent, or Firm* — Lerner, David, Littenberg, Krumholz & Mentlik, LLP

(57) ABSTRACT

The present invention provides a positive active material for a rechargeable lithium battery, the active material including a dopant and having a crystalline structure in which metal oxide layers (MO layers) including metals and oxygen and reversible lithium layers are repeatedly stacked, wherein in a lattice configured by oxygen atoms of the MO layers adjacent to each other, the dopant time of charge, thereby forming a lithium trap and/or lithium dumbbell structure.

16 Claims, 6 Drawing Sheets

(51) Int. Cl.
*H01M 4/1391* (2010.01)
*H01M 4/36* (2006.01)
*C01G 51/00* (2006.01)
*H01M 10/052* (2010.01)

(52) U.S. Cl.
CPC ......... *H01M 4/1391* (2013.01); *H01M 4/366* (2013.01); *H01M 10/052* (2013.01)

(56) References Cited

U.S. PATENT DOCUMENTS

| | | | |
|---|---|---|---|
| 11,081,695 B2* | 8/2021 | Park | H01M 4/366 |
| 2002/0015887 A1 | 2/2002 | Gao et al. | |
| 2003/0211235 A1 | 11/2003 | Suh et al. | |
| 2005/0196674 A1 | 9/2005 | Chiga et al. | |
| 2006/0078795 A1 | 4/2006 | Takahashi et al. | |
| 2006/0194114 A1 | 8/2006 | Saito | |
| 2008/0131780 A1 | 6/2008 | Kawasato et al. | |
| 2009/0181311 A1 | 7/2009 | Iwanaga et al. | |
| 2013/0022869 A1 | 1/2013 | Yi | |
| 2013/0101893 A1 | 4/2013 | Dai et al. | |
| 2014/0050993 A1 | 2/2014 | Park | |
| 2014/0087257 A1 | 3/2014 | Gopukumar et al. | |
| 2014/0212745 A1 | 7/2014 | Kim et al. | |
| 2015/0014583 A1 | 1/2015 | Kaburagi et al. | |
| 2016/0133933 A1 | 5/2016 | Choi et al. | |
| 2016/0149210 A1 | 5/2016 | Yoo et al. | |
| 2017/0263925 A1* | 9/2017 | Shim | B01J 13/04 |
| 2017/0263930 A1 | 9/2017 | Inoue et al. | |
| 2017/0309894 A1 | 10/2017 | Hu et al. | |

FOREIGN PATENT DOCUMENTS

| | | |
|---|---|---|
| EP | 2630686 A1 | 8/2013 |
| EP | 3352263 A1 | 7/2018 |
| JP | 2000509193 A | 7/2000 |
| JP | 2003157844 A | 5/2003 |
| JP | 2005050779 A | 2/2005 |
| JP | 2005243301 A | 9/2005 |
| JP | 4106186 B2 | 6/2008 |
| JP | 4839633 B2 | 12/2011 |
| JP | 2013161622 A | 8/2013 |
| JP | 2014038828 A | 2/2014 |
| JP | 2014216077 A | 11/2014 |
| JP | 2015056252 A | 3/2015 |
| KR | 100269249 B1 | 10/2000 |
| KR | 20030088247 A | 11/2003 |
| KR | 20070109863 A | 11/2007 |
| KR | 100864199 B1 | 10/2008 |
| KR | 20090017535 A | 2/2009 |
| KR | 101135501 B1 | 4/2012 |
| KR | 20140072119 A | 6/2014 |
| KR | 20140117311 A | 10/2014 |
| KR | 20150049288 A | 5/2015 |
| KR | 20150101181 A | 9/2015 |
| KR | 20160061077 A | 5/2016 |
| KR | 20170048487 A | 5/2017 |
| WO | 2007052712 A1 | 5/2007 |
| WO | 2007129854 A1 | 11/2007 |
| WO | 2016129629 A1 | 8/2016 |
| WO | 2017002057 A1 | 1/2017 |

OTHER PUBLICATIONS

Extended European Search Report including Written Opinion for Application No. EP17848969.6 dated Nov. 6, 2018.
Wang, Z., et al., "Improving the cycling stability of LiCoO2 at 4.5V through co-modification by Mg doping and zirconium oxyfluoride coating", Ceramics International, Sep. 1, 2014, vol. 41, No. 1, pp. 469-474, XP055518822.
Thirunakaran, R., et al., "Synthesis and electrochemical characterization on dual-doped LiCoO2 via green chemistry method for lithium rechargeable batteries", Journal of Applied Chemistry, Apr. 6, 2014, vol. 44, No. 6, pp. 709-718, XP055519146.
C.R. Fell et al., "High Pressure driven structural and electrochemical modifications in layered lithium transition metal intercalation oxides", Energy & Environmental Science, Accepted Dec. 15, 2011, vol. 5, pp. 6214-6224.
H. Tukamoto et al. "Electronic Conductivity of LiCoO2 and Its Enhancement by Magnesium Doping" J Electrochem. Soc. vol. 144 No. 9; Sep. 1997.
Chinese Search Report for Application No. 201780009769.1 dated Aug. 11, 2020, 2 pages.

* cited by examiner

POSITIVE ELECTRODE ACTIVE MATERIAL FOR LITHIUM SECONDARY BATTERY, COMPRISING LITHIUM COBALT OXIDE FOR HIGH VOLTAGE, AND METHOD FOR PREPARING SAME

CROSS-REFERENCE TO RELATED APPLICATIONS

This application is a divisional of U.S. application Ser. No. 16/070,588 filed Jul. 17, 2018, which is a national phase entry under 35 U.S.C. § 371 of International Application No. PCT/KR2017/007599, filed on Jul. 14, 2017, which claims the benefit of Korean Patent Application No. 10-2016-0116951, filed in the Korean Intellectual Property Office on Sep. 12, 2016, the disclosures of which are incorporated herein by reference.

TECHNICAL FIELD

The present invention relates to a positive electrode active material for a rechargeable lithium battery including a lithium cobalt oxide for a high voltage, and a method for preparing same.

BACKGROUND

As technology development and demand for mobile devices have increased, there has been a rapid increase in demand for secondary batteries as energy sources, and thus a rechargeable lithium battery of secondary batteries having high energy density and operation potential, a long cycle-life, and a low discharge rate has been commercially available.

In addition, considerable research on an electric vehicle and a hybrid electric vehicle to replace a vehicle using a fossil fuel such as a gasoline vehicle, a diesel vehicle, and the like, which are regarded as primary causes of air pollution, has been undertaken, as interest in the environment has recently increased. The electric vehicle, the hybrid electric vehicle, and the like mainly have a power source of a nickel hydrogen metal secondary battery, but researches on utilizing a rechargeable lithium battery having a high energy density and discharge have been actively made, and they are entering the commercialization stage.

Representatively, a prismatic secondary battery and a pouch secondary battery applicable to a product such as a mobile phone having a thin thickness have been highly demanded in a view of a battery shape, and a rechargeable lithium battery such as a lithium ion battery, a lithium ion polymer battery, and the like having a merit of high energy density, discharge, output stability, and the like is highly demanded in a view of a material.

Currently, $LiCoO_2$, a ternary system (NMC/NCA), $LiMnO_4$, $LiFePO_4$, and the like are being used as a positive electrode material for the rechargeable lithium battery. Among them, $LiCoO_2$ has problems in that cobalt is expensive and it has low capacity in the same voltage compared to the ternary system, so the amount of use of the ternary system and the like has been gradually increasing to provide a secondary battery with higher capacity.

However, $LiCoO_2$ has been mainly used so far since it has excellent properties such as a high compression density and electrochemical characteristics such as a high cycle characteristic. At the same time, $LiCoO_2$ has problems in that a charge and discharge current amount is low at about 150 mAh/g, and a crystalline structure at a voltage of greater than or equal to 4.3 V is unstable to decrease a cycle-life characteristic.

Particularly, when applying a high voltage for developing a high-capacity secondary battery, a Li amount for $LiCoO_2$ is increased, so it has problems in that the possibilities of destabilizing a surface and a structure arise to generate a gas due to a side-reaction with the electrolyte solution, so stability is deteriorated, for example, combustion or a swelling phenomenon, and cycle-life characteristics are dramatically deteriorated.

In order to solve the problems, doping or coating a metal such as Al, Ti, Mg, or Zr on a surface of the $LiCoO_2$ is a method that is generally used. However, even in the case of doping the metal, a phase change may be generated, and furthermore, in the case of a coating layer including the metal, it may interrupt Li ion transfer during the charge and discharge, thereby potentially causing the performance of the secondary battery to be deteriorated.

Accordingly, it is stably oxidized/reduced only until about 4.45 V through the conventional doping/coating method, so different approaches from the conventional art are needed at greater than or equal to 4.5 V.

Thus, there is a great need to develop a lithium cobalt oxide-based positive active material which may ensure structural stability without deteriorating performance even at a high voltage.

Technical Problem

The present invention aims to solve the above-described problems of the conventional art and technical problems required from the past.

By repeating in-depth studies and various experiments, the inventors of this application confirmed that when lithium cobalt oxide particles include a certain element as a dopant, wherein in a crystalline structure in which metal oxide layers (MO layers) including metals and oxygen and reversible lithium layers are repeatedly stacked, the dopant and/or lithium ions move from octahedral sites to tetrahedral sites at the time of charge, thereby forming a lithium trap and/or a lithium dumbbell structure, which will be described later, a desirable effect is exhibited, and completed the present invention.

Technical Solution

The positive electrode active material for a rechargeable lithium battery including the lithium cobalt oxide particles according to the present invention includes lithium cobalt oxide particles including at least one selected from Mg, Nb, Zr, Ti, Mo, and V as a dopant;

the lithium cobalt oxide particles have a crystalline structure in which metal oxide layers (MO layers) including metals and oxygen and reversible lithium layers in which lithium ions move reversibly at the time of charge and discharge are repeatedly stacked; and the dopant and/or lithium ions move from octahedral sites to tetrahedral sites at the time of charge in a lattice configured by oxygen atoms of the MO layers adjacent to each other, thereby forming a lithium trap and/or lithium dumbbell structure.

Generally, when the lithium cobalt oxide is used as a positive active material at a high voltage, it causes problems in that the crystal structure becomes defective while a large amount of lithium ions are released from the lithium cobalt oxide particles, such that the destabilized crystalline structure collapses to deteriorate reversibility. In addition, in a state in which the lithium ion is released, when $Co^{3+}$ or $Co^{4+}$ ions present on the surface of the lithium cobalt oxide particle are reduced by an electrolyte solution, oxygen is detached from the crystalline structure to accelerate the structural collapse.

Accordingly, in order to stably use the lithium cobalt oxide under a high voltage, even if a large amount of lithium ions are emitted, the side reaction of Co ions and the electrolyte solution should be suppressed while the crystalline structure thereof is stably maintained.

Therefore, in the present invention, the lithium cobalt oxide particles include a dopant of Mg, Nb, Zr, Ti, Mo, V, and the like in a structure in which MO layers and reversible lithium layers are repeatedly stacked, and when the dopant and/or lithium ions move from octahedral sites to tetrahedral sites at the time of charge, thereby forming a lithium trap and/or a lithium dumbbell structure, a repulsive force among metals of the MO layer, lithium ions of the tetrahedral site, and dopants occurs to suppress a phenomenon in which the MO layers relatively slide, thereby effectively preventing the structural change.

The lithium trap structure is a structure in which lithium ions are disposed in tetrahedral sites at the time of charge, in a lattice configured by oxygen atoms of the first MO layer and the second MO layer adjacent to each other, and in this case, a repulsive force in a vertical direction occurs among metal cations of the second MO layer, lithium ions of the tetrahedral site, and a dopant of the first MO layer, so as to function as a kind of stopper when the MO layer slides in a horizontal direction, thereby suppressing the structural change.

Similarly, the lithium dumbbell structure is a structure in which lithium ions between the first MO layer and the second MO layer are in a tetrahedral site at the time of charge, and dopants between the second MO layer and the third MO layer are in the tetrahedral site, wherein the lithium ions and the dopant are symmetrically positioned on a center of the second MO layer in a lattice configured by oxygen atoms of the mutually adjacent first MO layer, second MO layer, and third MO layer, and a repulsive force occurs in a vertical direction among the lithium ions at the tetrahedral site between the first MO layer and the second MO layer, the metal cations of the second MO layer, and the dopants at the tetrahedral side between the second MO layer and the third MO layer, so as to function as a kind of a stopper when the MO layer is slid in a horizontal direction, thereby suppressing the structure change.

For understanding the structures, schematic views thereof are shown in FIGS. 4 and 5.

Referring to FIGS. 4 and 5, the lithium cobalt oxide has a crystalline structure in which a MO layer commonly including a metal and oxygen and a reversible lithium layer in which lithium ions reversibly move at the time of charge and discharge are repeatedly stacked.

First, for describing a structure of the lithium trap, referring to a left view of FIG. 4 together with FIG. 5, cobalt ions of a first MO layer and a second MO layer and lithium ions of a lithium layer are disposed at all octahedral sites in a lattice region including no dopant in the crystalline structure, but in the lattice region where the cobalt (Co) ions of the first MO layer are substituted with a dopant such as Mg, Zr, and the like, the crystalline structure is changed so that lithium ions of the lithium layer disposed between the first MO layer and the second MO layer and the dopant of the first MO layer move to tetrahedral sites, which is called a lithium trap structure. When obtaining the structure, when sliding in a horizontal direction in the crystalline structure of the lithium cobalt oxide, the lithium ions of the lithium layer and the Co ions of the MO layers are disposed in a diagonal line in a region including no dopant, so there is no increase of the internal energy, but in a region including the dopant and forming the lithium trap structure, the lithium ions of the lithium layer, Co ions of the second MO layer, and dopant of the first MO layer are all disposed in a straight line to generate a repulsive force among them, so accompanying the internal energy increase to maintain the structure, and thereby the sliding is prevented by the characteristics that a material is to exist in the most stable state which has the lowest internal energy.

Similarly, the lithium dumbbell structure shown in a right view of FIG. 4 has the same fundamental forming protocol as in the lithium trap structure, but lithium ions between the first MO layer and the second MO layer and dopants between the second MO layer and the third MO layer move to tetrahedral sites, meaning a structure in which the lithium ions and the dopants are symmetrically disposed to each other in the center of the second MO layer.

In this case, in order to clearly describe the tetrahedral site and the octahedral site, the schematic view thereof is shown in FIG. 1.

Referring to FIG. 1, the tetrahedral site (hole) refers to a space formed in a center of an atom cluster when a single atom is contacted with three atoms of an atomic layer disposed below the same, so two tetrahedral sites exist per atom when atoms having the same size are positioned as near as possible, and the octahedral site (hole) refers to a space formed in a cluster of six atoms for an octahedron which is formed when each of three atoms for two pairs of triangles contact with an alignment angle of 60 degree, wherein the space is larger than the tetrahedral site, and one octahedral site is present per atom when the atoms having the same size are disposed as near as possible.

Accordingly, both the lithium dumbbell structure and the lithium trap structure may suppress the structural change by generating the repulsive force among the metal cations, dopants, and lithium ions in a vertical direction, but in a case of the lithium dumbbell structure, a trap structure is formed not only between the first MO layer and the second MO layer but also between the second MO layer and the third MO layer, unlike the lithium trap structure, so it is more preferably since it provides much better structural stability effects than the lithium trap structure generating the repulsive force between first MO layer and the second MO layer.

The dopant which may form the lithium trap or the lithium dumbbell structure may be included at 0.001 to 1 wt % based on the cobalt amount of the lithium cobalt oxide particle, more particularly, the dopant amount may be included at 0.01 wt % to 0.3 wt %, specifically, 0.02 wt % to 0.2 wt %, and more specifically, 0.02 wt % to 0.1 wt %, to provide an active material with excellent capacity and energy by improving the sufficiently high voltage stability and also maintaining the high Co amount.

When the amount of dopant is less than 0.001 wt % which is out of the range, the ratio of the dopant in the positive active material particle is too low to obtain the described structure, so the effect of improving the structural stability of the active material is almost nothing, and on the other hand, when is greater than 1 wt %, the ratio of the dopant in the positive active material particle is excessively high, even causing deterioration of the lithium transfer, so it has problems in that the output characteristic is deteriorated, and the overall capacity of the positive active material is relatively decreased.

Meanwhile, the lithium trap structure and the lithium dumbbell structure may be formed differently depending upon a kind of a predetermined dopant.

In one specific example, the dopant includes at least one selected from Mg, Nb, Zr, and V, and may form a lithium trap and a lithium dumbbell structure.

In addition, the dopant includes at least one selected from Mg, Nb, Zr, Ti, Mo, and V, and may form a lithium trap structure.

The forming of the structure according to a kind of the dopant as stated above is further described in detail in the following Experimental Example 1.

From the results as stated above, in order to further improve the structural stability of the lithium cobalt oxide, it is more preferable for the lithium cobalt oxide particle according to the present invention to include at least one selected from a group consisting of Mg, Nb, Zr, and V as a dopant, and more specifically, the dopant may be Mg and/or Zr.

Meanwhile, in the positive active material for a secondary battery cell according to the present invention, when r refers to an average radius of the lithium cobalt oxide particle, the dopant concentration of an outer bulk of a particle surface to 0.9*r may be relatively higher than the dopant concentration of an inner bulk from 0.9*r to a particle center.

In one example, the positive active material according to the present invention may include Mg as a dopant included in the lithium cobalt oxide particle, and the Mg concentration of the outer bulk may be relatively higher than the Mg concentration in the inner bulk.

In another example, the positive active material according to the present invention may include Mg and Zr as the dopant included in the lithium cobalt oxide particle, where Zr is primarily included in the outer bulk, and Mg is mostly included in the inner bulk, and the Zr concentration of the outer bulk is relatively higher than the Mg concentration of the inner bulk.

Thus when the positive active material for a secondary battery according to the present invention is prepared by the following method, when the dopant concentration of the outer bulk of the particle surface of the lithium cobalt oxide to 0.9*r is formed relatively higher than the dopant concentration of the inner bulk of 0.9*r to the particle center, an appropriate ratio of the dopants included in the outer bulk and the inner bulk may effectively prevent the sliding phenomenon of the MO layers on the surface even under the charge condition of greater than or equal to 4.5 V, thereby further improving stability of the positive active material.

At a high voltage of greater than or equal to 4.5 V, almost no Li remains on the surface of $LiCoO_2$, so it is very easy to convert it to an 01 phase. Accordingly, the surface should be strengthened to prevent a phase transition, and it is therefore necessary to set the dopant concentration in the inner bulk to be higher than the dopant concentration of the outer bulk.

When the medium particle size (D50) is too small, it is not preferable since it is difficult to fabricate a particle, and the crystalline structure according to the present invention may be incomplete, and on the other hand, when it is too large, it undesirably has a poor compression density of the electrode including particles.

Accordingly, the lithium cobalt oxide particle according to the present invention may have a medium particle size (D50) of 5 micrometers to 25 micrometers, particularly, 10 micrometers to 25 micrometers, and more particularly, 15 micrometers to 20 micrometers.

It may further include at least one selected from a group consisting of Ca, Al, Sb, Si, and Zn, and more particularly, at least one metal selected from a group consisting of Ca, Al, and Sb, in order to stabilize the crystalline structure, in addition to the dopant.

The lithium cobalt oxide particle may be further coated by protective chemicals, wherein the protective chemicals may be at least one of a metal, an oxide, a phosphate, and a fluoride, and the metal may be at least one of Mg, Nb, Zr, Ti, Mo, V, Zn, Si, and Al.

The protective chemicals may be coated on a lithium cobalt oxide particle using solution reaction, mechanical grinding, solid reaction, and the like, and may reduce a speed of reacting an electrolyte in the separator with the lithium cobalt oxide particle during the charge and discharge of a battery cell, so as to suppress expansion or capacity loss caused by the reaction of the positive electrode active coating.

In this case, the amount of the protective chemical coated on the lithium cobalt oxide particle may be 0.02 wt % to 0.8 wt %, and the thickness may be 30 nm to 250 nm. When is included at less than 0.02 wt % or formed in a thickness of less than 30 nm, it may not obtain the desirable effects, and when is included at greater than 0.8 wt % or formed in a thickness of greater than 250 nm, it is not preferable since the output characteristics of the battery are deteriorated.

According to the findings of the inventors of the present invention, it is confirmed that the lithium cobalt oxide particle according to the present invention has excellent chemical stability when the amount of the protective chemicals is 0.02 wt % to 0.6 wt %, particularly, 0.03 wt % to 0.4 wt %, and more particularly, 0.04 wt % to 0.1 wt %.

In addition, when the protective chemicals have a thickness of 30 nm to 200 nm, particularly, 30 nm to 185 nm, and more particularly, 30 nm to 150 nm, desirable output characteristics are confirmed.

The present invention provides a method of preparing a positive active material for a secondary battery, and the method includes:

(a) mixing a cobalt precursor, a lithium precursor, and a first doping precursor and then firing the same to synthesize a first doping particle;

(b) coating a second doping precursor on a surface of the first doping particle; and (c) heating the coated first doping particle to synthesize a second doping particle which is a lithium cobalt oxide particle.

That is, the lithium cobalt oxide particle according to the present invention may be obtained through two sequentially performed doping processes, and specifically, the lithium cobalt oxide particle according to the present invention may be obtained by processes of mixing an appropriate amount of the first doping precursor in the precursor state and firing the same to provide a lithium cobalt-based oxide particle substituted with a dopant, coating a salt including an appropriate amount of the dopant on a surface of the first doping particle to coat a second doping precursor on the surface of the first doping particle, and then heat treating the same to provide a second doping particle.

The method includes mixing a cobalt precursor with a lithium precursor and a doping precursor under an air atmosphere and primarily firing the same, and then coating a second doping precursor and secondarily firing the same to synthesize a lithium cobalt oxide particle, so it may maintain a higher dopant concentration on the surface compared to the case of mixing the cobalt precursor, the lithium precursor, and the doping precursor and firing the same only one time to synthesize a lithium cobalt oxide particle, and it may be synthesized in a state in which dopants are uniformly dispersed even to the inside of the particle compared to the case of synthesizing a undoped lithium cobalt oxide particle and then coating the doping precursor and firing the same, so it is more preferable in a view of imparting the desirable effects.

Herein, the cobalt precursor is a cobalt oxide, and the kind of the cobalt oxide used in the method according to the present invention is not limited, but particularly, may be at least one selected from the group consisting of $CO_3O_4$, $CoCO_3$, $Co(NO_3)_2$, and $Co(OH)_2$.

In addition, the lithium precursor is not limited as long as the compound includes a lithium source, particularly, at least one selected from the group consisting of $Li_2CO_3$, LiGH, $LiNO_3$, $CH_3COOLi$, and $Li_2(COO)_2$.

The doping precursor may be at least one selected from the group consisting of a metal, a metal oxide, or a metal salt for the dopants, and the first doping precursor and the second doping precursor are composed of a metal, a metal oxide, or a metal salt including at least one independently selected from the group consisting of Mg, Nb, Zr, Ti, Mo, and V. In one specific example, the first doping precursor and the second doping precursor may be the same or different.

But when the first doping precursor is the same as the second doping precursor, it may show excellent results in both views of the inside doping effect and the surface doping effect. In other words, when the first doping particle particularly enhances the structural safety, the second doping particle including the same elements as in the first doping particle may also provide excellent surface safety. Thus it is more preferable than the case of including different dopants.

Meanwhile, an amount of the dopant doped from the second doping precursor may be greater than or equal to the amount of the dopant doped from the first doping precursor.

Herein, the first doping particle generated from the first doping precursor is mainly disposed in the inner bulk of 0.9*r to the particle center, and the second doping particle generated from the second doping precursor is generally disposed in the outer bulk of the particle surface to 0.9*r, so it may be formed so that the dopant concentration of the outer bulk of the lithium cobalt oxide is relatively higher than the dopant concentration of the inner bulk.

As the structural change of the layered positive electrode material such as a lithium cobalt oxide at a high voltage of greater than or equal to 4.5 V occurs from the surface, the surface of the lithium cobalt oxide particle, which is the outer bulk, is formed at a higher concentration than the inner bulk to more strongly suppress the structural change of the surface, thereby providing effects of further improving the stability.

Meanwhile, the firing of the process (a) may be performed at 900° C. to 1100° C. for 8 hours to 12 hours, and the heat treatment of the process (c) may be performed at 700° C. to 900° C. for 1 hour to 6 hours.

When the process (a) and the process (c) are performed out of the ranges, for example, performed at an excessively low temperature or for an excessively short time, the inside structure and the surface structure of the positive active material particle are unstably formed and unfavorably doped, and on the other hand, when the process (a) and the process (c) are performed out of the ranges, for example, performed at an excessively high temperature or for an excessively long time, the physical and chemical characteristics of the lithium cobalt-based oxide for the positive active material particle are changed, even unfavorably causing performance deterioration.

The present invention provides a positive electrode manufactured by coating a slurry including the positive active material for a secondary battery, a conductive material, and a binder on a current collector.

The positive electrode may be manufactured by, for example, coating a positive electrode mixture including the positive active material, a conductive material, and a binder, on a positive electrode current collector, and drying it, and if required, the positive electrode mixture may further include a filler.

The positive electrode current collector is generally made at a thickness of 3 to 500 μm, but this is not particularly limited as long as it does not cause a chemical change in the battery and has high conductivity, and for example, one selected from stainless steel, aluminum, nickel, titanium, and aluminum, or stainless steel of which the surface is treated with carbon, nickel, titanium, or silver, may be used, and specifically, aluminum may be used. The current collector may have fine irregularities formed on a surface thereof to increase adhesive force of the cathode active material, and various forms such as a film, a sheet, a foil, a net, a porous body, foam, a non-woven fabric body, and the like, are possibly used.

The positive active material may include, for example: a layered compound such as a lithium nickel oxide ($LiNiO_2$) layered compound 1 or a compound substituted with one or more transition metals; a lithium manganese oxide such as one of a chemical formula $Li_{1+x}Mn_{2-x}O_4$ (wherein x is 0 to 0.33), $LiMnO_3$, $LiMn_2O_3$, $LiMnO_2$, and the like; a lithium copper oxide ($Li_2CuO_2$); a vanadium oxide such as $LiV_3O_8$, $LiV_3O_4$, $V_2O_5$, $Cu_2V_2O_7$, and the like; a Ni site-type lithium nickel oxide represented by a chemical formula $LiNi_{1-x}M_xO_2$ (wherein M=Co, Mn, Al, Cu, Fe, Mg, B, or Ga, and x=0.01 to 0.3); a lithium manganese composite oxide represented by a chemical formula $LiMn_{2-x}M_xO_2$ (wherein M=Co, Ni, Fe, Cr, Zn, or Ta, and x=0.01 to 0.1) or $Li_2Mn_3MO_8$ (wherein M=Fe, Co, Ni, Cu, or Zn); $LiMn_2O_4$ in which a part of Li in the chemical formula is substituted with an alkaline earth metal ion; a disulfide compound; $Fe_2(MoO_4)_3$; and the like, in addition to the lithium cobalt oxide particle, but is not limited thereto.

The conductive material is generally added in an amount of 1 to 30 wt % based on the total weight of the mixture including the positive active material. Such a conductive material is not particularly limited as long as it has conductivity without causing a chemical change in the battery, and examples thereof may include: graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum, and nickel powder; conductive whiskers such as zinc oxide and potassium titanate; conductive metal oxides such as titanium oxide; conductive materials such as polyphenylene derivatives; and the like.

The binder included in the positive electrode is a component that assists in bonding between the active material and the conductive material and bonding to the current collector, and is generally added in an amount of 1 to 30 wt % based on the total weight of the mixture including the cathode active material. Examples of the binder may include polyvinylidene fluoride, polyvinyl alcohol, carboxylmethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, a fluorine rubber, various copolymers, and the like.

The present invention also provides a secondary battery characterized by including the positive electrode and the negative electrode, and an electrolyte solution. The secondary battery is not particularly limited, but specific examples thereof include a rechargeable lithium battery such as a lithium ion battery and a lithium ion polymer battery having advantages such as high energy density, discharge voltage, and output stability.

Generally, the rechargeable lithium battery includes a positive electrode, a negative electrode, a separator, and a lithium salt-containing non-aqueous electrolyte solution.

Hereinafter, other aspects of the rechargeable lithium battery are described.

The negative electrode is manufactured by coating and drying the negative active material on the negative current collector, and optionally, may further include components as described above as needed.

The negative current collector is generally made in a thickness of 3 to 500 micrometers. Such a negative current collector is not particularly limited as long as it has conductivity without causing a chemical change in the battery, and for example, copper, stainless steel, aluminum, nickel, titanium, fired carbon, or copper, or stainless steel of which the surface is treated with carbon, nickel, titanium, silver, and the like, an aluminum-cadmium alloy, or the like, may be used. Further, like the positive electrode current collector, the binding force of the negative active material may be strengthened by forming fine irregularities on the surface thereof, and various forms such as a film, a sheet, a foil, nets, a porous body, foam, and a non-woven fabric body may be used.

The negative active material may include, for example: carbon such as hard carbon and graphite-based carbon; a metal composite oxide such as $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, Groups 1, 2, and 3 elements of the periodic table, a halogen; $0 < x \leq 1$; $1 \leq y \leq 3$; $1 \leq z \leq 8$); a lithium metal; a lithium alloy; a silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni-based materials; and the like.

The separator is interposed between the positive electrode and the negative electrode, and an insulating thin film having high ion permeability and mechanical strength is used. The separator has a pore diameter of generally 0.01 to 10 μm, and a thickness of 5 to 300 μm. For the separator, for example, an olefin-based polymer such as polypropylene, which is chemically resistant and hydrophobic, or the like, or a sheet or a nonwoven fabric formed of a glass fiber, polyethylene, or the like, is used. In the case that a solid electrolyte such as a polymer is used as the electrolyte, the solid electrolyte may also serve as the separator.

The lithium salt-containing non-aqueous electrolyte solution is composed of a non-aqueous electrolyte solution and a lithium salt. The non-aqueous electrolyte solution may include a non-aqueous organic solvent, an organic solid electrolyte, an inorganic solid electrolyte, and the like, but is not limited thereto.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxy Franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

The organic solid electrolyte may include, for example, polyethylene derivatives, polyethylene oxide derivatives, polypropylene oxide derivatives, phosphate ester polymers, poly agitation lysine, polyester sulfide, polyvinyl alcohol, polyfluorovinylidene, polymers including an ionic dissociation group, and the like.

The inorganic solid electrolyte may include, for example, nitrides, halides, sulfates, or the like of Li such as $Li_3N$, LiI, $Li_5NI_2$, $Li_3N$—LiI—LiOH, $LiSiO_4$, $LiSiO_4$—LiI-LiGH, $Li_2SiS_3$, $Li_4SiO_4$, $Li_4SiO_4$—LiI—LiOH, $Li_3PO_4$—$Li_2S$—$SiS_2$, and the like.

The lithium salt is a material which is readily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic lithium carbonates, 4 phenyl lithium borate, imides, and the like may be used.

Further, to the non-aqueous electrolyte solution, for the purpose of improving charge and discharge characteristics, flame retardancy and the like, for example, pyridine, triethylphosphite, triethanolamine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, and the like may be added. In some cases, for imparting incombustibility, a halogen-containing solvent such as carbon tetrachloride and ethylene trifluoride may be further included, and for improving high temperature storage characteristics, carbon dioxide gas may be further included, and FEC (fluoro-ethylene carbonate), PRS (propene sultone), and the like may be further included.

The present invention provides a battery pack including the secondary battery and a device including the battery pack, wherein the battery pack and the device are known in the art, so the detailed descriptions are omitted in the present specification.

The device may be, for example, a laptop computer, a netbook, a tablet PC, a mobile phone, an MP3, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a system for electric power storage, but is not limited thereto.

MODE FOR INVENTION

Figure 1:
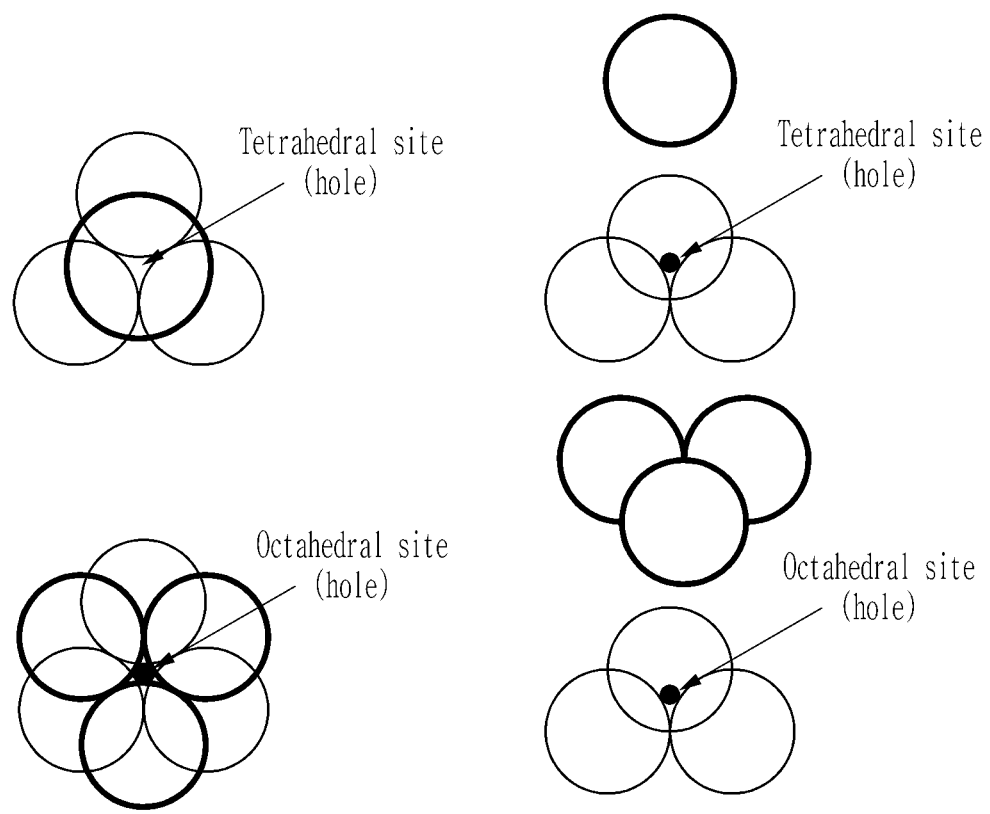
FIG. 1 is a schematic view showing an octahedral site or a tetrahedral site where a dopant or a lithium ion is disposed.

Hereinafter, exemplary embodiments of the present invention will be described referring to drawings, but this is for easier understanding of the present invention, and the scope of the present invention is not limited thereto.

Preparation Example 1

8.19 g of $Co_3O_4$ and 3.74 g of $Li_2CO_3$ were mixed and then fired in a furnace at 1000° C. for 10 hours to provide a lithium cobalt oxide.

Preparation Example 2

8.19 g of $Co_3O_4$, 3.74 g of $Li_2CO_3$, and 1000 ppm of Al (Al source: $Al_2O_3$) were mixed and then fired in a furnace at 1000° C. for 10 hours to provide a lithium cobalt oxide in which Al of the lithium cobalt oxide was doped.

Preparation Example 3

A lithium cobalt oxide was obtained in accordance with the same procedure as in Preparation Example 2, except that Mg (Mg source: MgO) was used as a dopant instead of the Al in Preparation Example 2.

Preparation Example 4

A lithium cobalt oxide was obtained in accordance with the same procedure as in Preparation Example 2, except that Ti (Ti source: $TiO_2$) was used as a dopant instead of the Al in Preparation Example 2.

Preparation Example 5

A lithium cobalt oxide was obtained in accordance with the same procedure as in Preparation Example 2, except that Zr (Zr source: $ZrO_2$) was used as a dopant instead of the Al in Preparation Example 2.

Preparation Example 6

A lithium cobalt oxide was obtained in accordance with the same procedure as in Preparation Example 2, except that Nb (Nb source: $Nb_2O_5$) was used as a dopant instead of the Al in Preparation Example 2.

Preparation Example 7

A lithium cobalt oxide was obtained in accordance with the same procedure as in Preparation Example 2, except that Ta (Ta source: $Ta_2O_5$) was used as a dopant instead of the Al in Preparation Example 2.

Preparation Example 8

A lithium cobalt oxide was obtained in accordance with the same procedure as in Preparation Example 2, except that Mo (Mo source: $MoO_3$) was used as a dopant instead of the Al in Preparation Example 2.

Preparation Example 9

A lithium cobalt oxide was obtained in accordance with the same procedure as in Preparation Example 2, except that W (W source: $WO_3$) was used as a dopant instead of the Al in Preparation Example 2.

Preparation Example 10

A lithium cobalt oxide was obtained in accordance with the same procedure as in Preparation Example 2, except that V (V source: $V_2O_5$) was used as a dopant instead of the Al in Preparation Example 2.

Preparation Example 11

A lithium cobalt oxide was obtained in accordance with the same procedure as in Preparation Example 2, except that Mn (Mn source: $MnO_2$) was used as a dopant instead of the Al in Preparation Example 2.

Experimental Example 1

The lithium cobalt oxides obtained from Preparation Examples 1 to 11 were used as a positive active material, PVdF was used as a binder, and natural graphite was used as a conductive material. The positive active material:the binder:the conductive material were mixed at a weight ratio of 96:2:2 into NMP and then coated on an Al foil having a thickness of 20 μm and dried at 130° C. to provide a positive electrode. Using a lithium foil as a negative electrode and an electrolyte solution in which 1M of $LiPF_6$ was dissolved in a solvent of EC:DMC:DEC=1:2:1, a half coin cell was fabricated.

Figure 2:
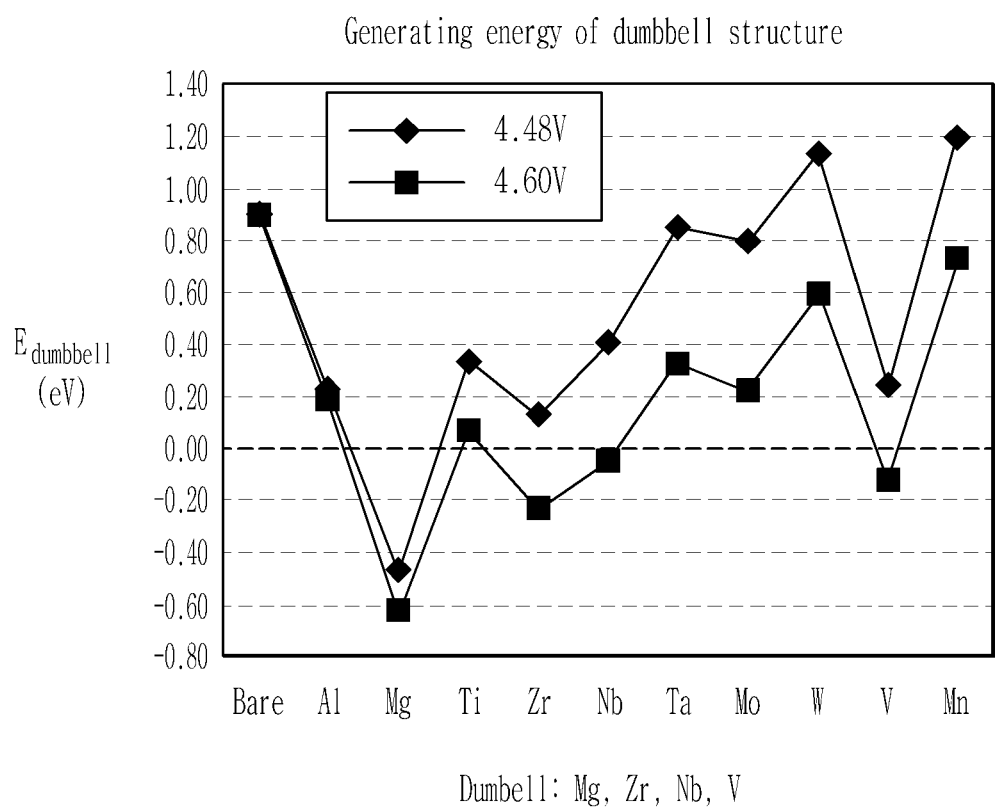
FIG. 2 is a graph showing generated energy of a lithium dumbbell structure according to Experimental Example 1 of the present invention.
Figure 3:
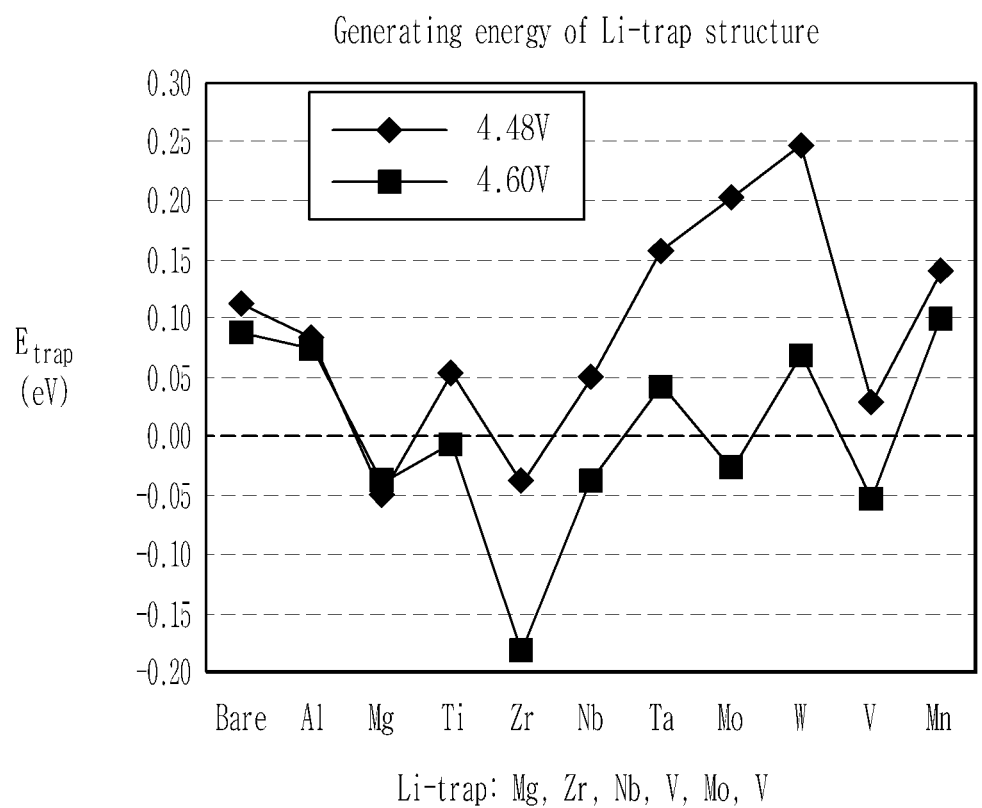
FIG. 3 is a graph showing generated energy of a lithium trap structure according to Experimental Example 1 of the present invention.
Figure 4:
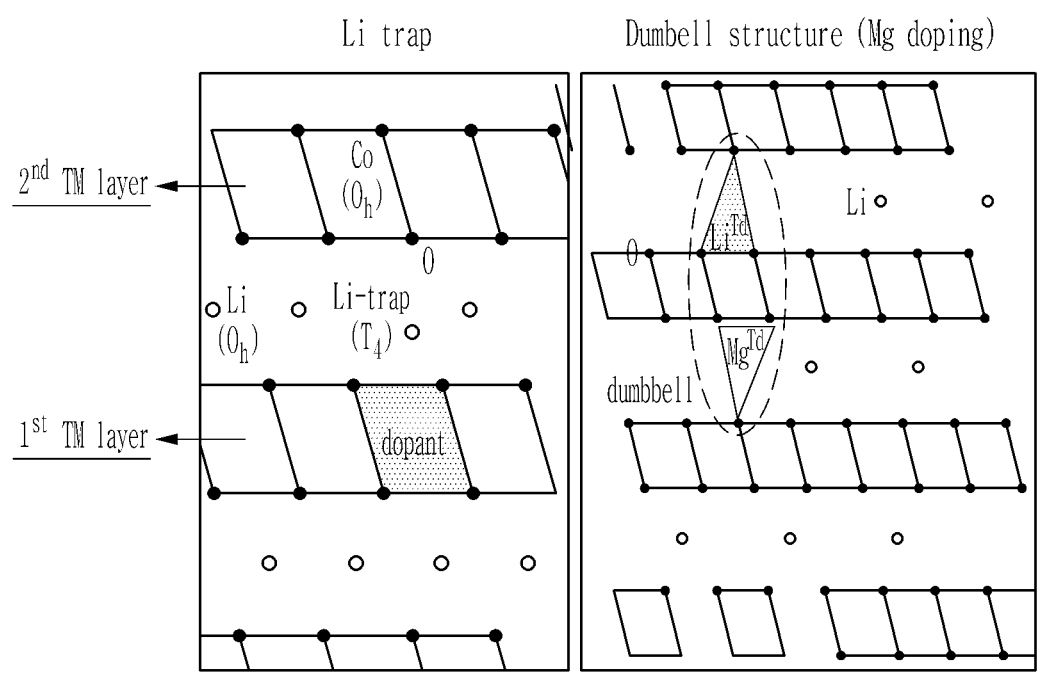
FIG. 4 is a schematic view showing a lithium dumbbell and a lithium trap structure according to an embodiment of the present invention.
Figure 5:
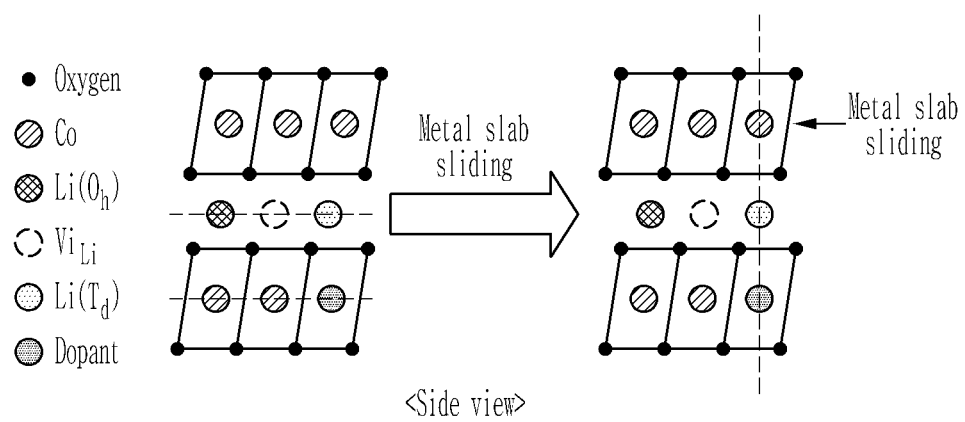
FIG. 5 is a side-sectional view of a dopant or a lithium ion in an octahedral site or a tetrahedral site according to an embodiment of the present invention.

While the obtained coin cells were charged at 1.0 C to 4.48 V, generated energy producing a lithium trap structure or dumbbell structure was measured and is shown in FIGS. 2 and 3, and while the obtained coin cells were charged at 1.0 C to 4.60 V, generated energy producing a lithium trap structure or dumbbell structure was measured and is shown in FIGS. 2 and 3.

Referring to FIG. 2, it is understood that when the lithium cobalt oxide particle includes Mg, Zr, Nb, or V as a dopant, the generated energy is a negative value, so the lithium dumbbell structure is spontaneously formed under a high voltage of 4.6 V.

In addition, referring to FIG. 3, when the lithium cobalt oxide particle includes Mg, Ti, Zr, Nb, Mo, or V as a dopant, the generated energy is a negative value, so it is understood that the lithium trap structure is spontaneously formed under a high voltage of 4.6 V.

Herein, referring to FIGS. 2 and 3, it is more preferable that Mg, Zr, Nb, or V among dopants have a negative value of the generated energy of the lithium trap structure and the dumbbell structure under the high voltage of 4.6 V. Particularly, Mg and Zr have the greatest negative value in the lithium dumbbell structure and the lithium trap structure, respectively, so it is understood that they are the most preferable elements for providing the structures.

The structure generation energy is calculated using VASP (Vienna Ab initio Simulation Program), the DFT functional uses PBE, and the Pseudo-potential uses PAW-PBE. In addition, the cut-off energy is calculated at 500 eV.

Example 1

8.19 g of $Co_3O_4$, 3.74 g of $Li_2CO_3$, and 400 ppm of Mg (Mg source: MgO) were mixed to provide 0.04 wt % of Mg based on a total weight of the lithium cobalt oxide particles, and then primarily fired in a furnace at 1000° C. for 10 hours to provide a lithium cobalt oxide in which Mg was doped in the inner bulk of the lithium cobalt oxide at a concentration of 400 ppm. Then, in order to provide a coating layer on the obtained lithium cobalt oxide, a salt including 600 ppm of Zr, which was 15 times (0.06 wt %) the doped Mg amount, was dry-mixed with lithium cobalt oxide particles and coated, and secondarily fired in a furnace at 800° C. for 4 hours to provide a positive active material in which Zr was doped on the outer bulk at a concentration of 600 ppm.

Example 2

8.19 g of $Co_3O_4$, 3.74 g of $Li_2CO_3$, and 600 ppm of Mg (Mg source: MgO) were mixed to provide 0.06 wt % of Mg based on a total weight of the lithium cobalt oxide particles, and then primarily fired in a furnace at 1000° C. for 10 hours to provide a lithium cobalt oxide in which Mg was doped in the inner bulk of the lithium cobalt oxide at a concentration of 600 ppm. In order to provide a coating layer on the obtained lithium cobalt oxide, a salt including 400 ppm of Mg, which was 0.66 times (0.04 wt %) the doped Mg amount, was dry-mixed with lithium cobalt oxide particles and coated, and then subjected to secondary firing in a furnace at 800° C. for 4 hours to provide a positive active material in which Mg was doped in the outer bulk at a concentration of 400 ppm.

Example 3

8.19 g of $Co_3O_4$, 3.74 g of $Li_2CO_3$, and 600 ppm of Mg were mixed to provide 0.06 wt % of Mg based on a total weight of the lithium cobalt oxide particle, and subjected to primary firing in a furnace at 1000° C. for 10 hours to provide a lithium cobalt oxide in which Mg was doped in the inner bulk of the lithium cobalt oxide at a concentration of 600 ppm. In order to provide a coating layer on the obtained lithium cobalt oxide, a salt including 400 ppm of Zr, which was 0.66 times (0.04 wt %) the doped Mg amount, was dry-mixed with lithium cobalt oxide particles and coated, and then subjected to secondary firing in a furnace at 800° C. for 4 hours to provide a positive active material in which Zr was doped in the outer bulk at a concentration of 400 ppm.

Example 4

8.19 g of $Co_3O_4$, 3.74 g of $Li_2CO_3$, and 400 ppm of Mg were mixed to provide Mg at 0.04 wt % based on a total weight of the lithium cobalt oxide particles, and then subjected to primary firing in a furnace at 1000° C. for 10 hours to provide a lithium cobalt oxide in which Mg was doped in the inner bulk of the lithium cobalt oxide at a concentration of 400 ppm. In order to provide a coating layer on the obtained lithium cobalt oxide, a salt including 600 ppm of Mg, which was 1.5 times (0.06 wt %) the doped Mg amount, was dry-mixed with lithium cobalt oxide particles and coated, and then subjected to secondary firing in a furnace at 800° C. for 4 hours to provide a positive active material in which Mg was doped in the outer bulk at a concentration of 400 ppm.

Comparative Example 1

The lithium cobalt oxide obtained from Preparation Example 3 was used as a positive active material.

Experimental Example 2

Each positive active material particle obtained from Examples 1 and 2 and Comparative Example 1, a binder of PVdF, and a conductive material of natural graphite were used. The positive active material:the binder:the conductive material were well mixed into NMP to provide a weight ratio of 96:2:2 and coated on an Al foil having a thickness of 20 μm and then dried at 130° C. to provide a positive electrode. As a negative electrode, a lithium foil was used, and an electrolyte solution in which 1M of $LiPF_6$ was dissolved in a solvent of EC:DMC:DEC=1:2:1 was used to provide a half coin cell.

Figure 6:
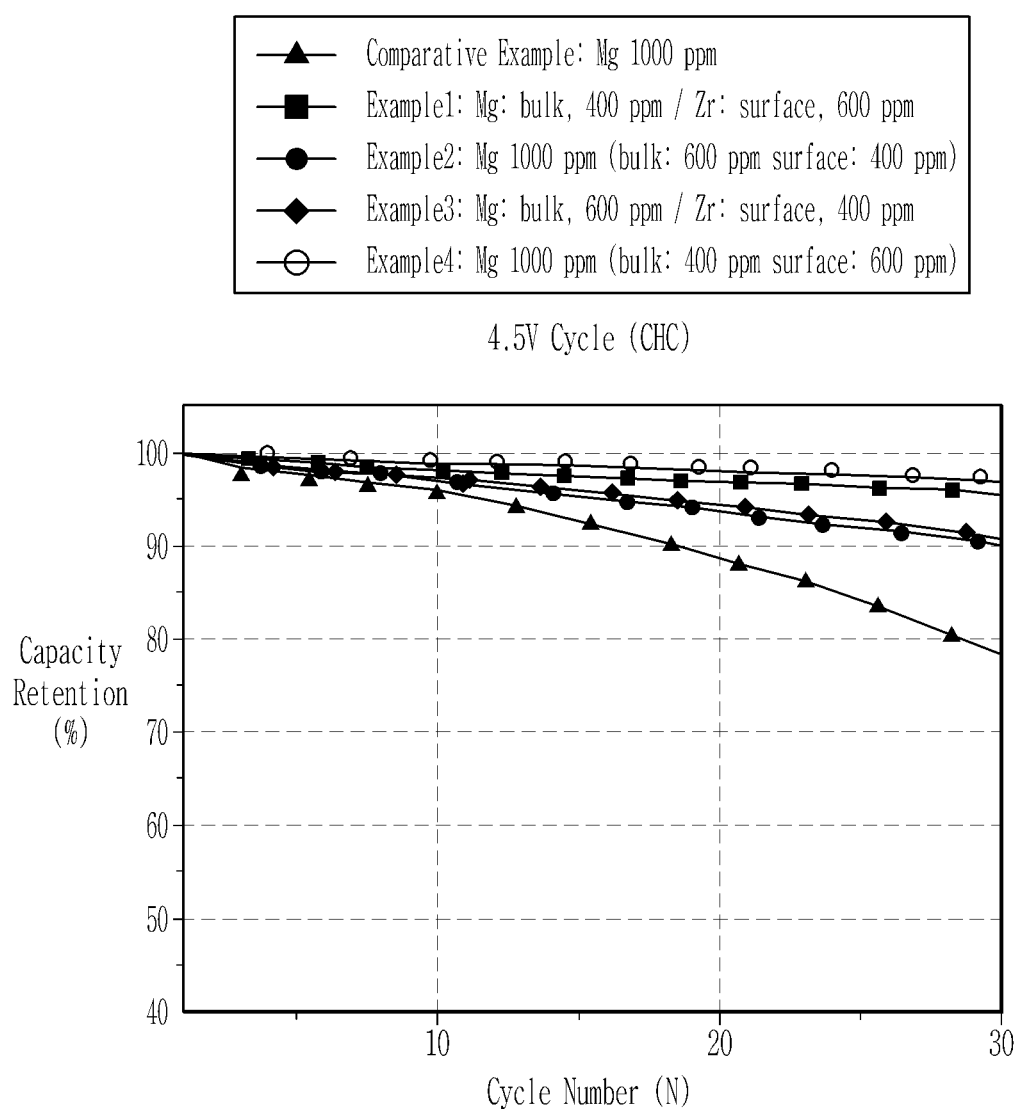
FIG. 6 is a graph showing capacity retention of each battery of Examples 1 and 2 according to experimental examples of the present invention and a comparative example depending upon a cycle number.

The obtained half coin cell was subjected to 30 cycles at 45° C. with an upper limit voltage of 4.5 V, and capacity retention was measured. The results are shown in the following Table 1 and FIG. 6.

TABLE 1

|  | Example 1 | Example 2 | Example 3 | Example 4 | Comparative Example 1 |
|---|---|---|---|---|---|
| Capacity retention (%) | 97.8% | 91.3% | 90.5% | 96.7% | 78.6% |

Referring to Table 1, it is confirmed that Examples 1 to 4 maintained high performance with capacity retention of greater than or equal to 90% even after 30 cycles and even under a high voltage condition of 4.5 V, compared to the case of using the undoped lithium cobalt oxide according to Comparative Example 1.

This is because the dopants included in the outer bulk of the lithium cobalt oxide particle suppressed the crystal structure collapse from the external surface, and the dopants included in the inner bulk suppressed a side reaction between the electrolyte solution and $Co^{4+}$ ions present on the particle surface in a state of discharging lithium ions, so as to stably maintain the crystal structure.

Meanwhile, as the concentration of dopants included in the outer bulk is higher than the concentration of the dopants included in the inner bulk in the cases of Examples 1 and 4, the surface stability may be further enhanced under the charge condition of greater than or equal to 4.5 V, compared to the cases of Examples 2 and 3, so it is confirmed that it has much better capacity retention of greater than or equal to 95% after the 30 cycles.

In addition, compared to Examples 1 with 4, it is confirmed that the case of doping the same elements in both the inner bulk and the outer bulk may have much better effects than the case of doping different elements.

Although description has been given with reference to an exemplary embodiment of the present invention, a person skilled in the art pertaining to the present invention may variously apply and modify the same within a scope of the present invention on the basis of the description.

As described above, the positive active material particle according to the present invention includes a predetermined element as a dopant, and has a crystalline structure in which metal oxide layers (MO layers) including metals and oxygen and reversible lithium layers are repeatedly stacked, and the dopant and/or lithium ions move from octahedral sites to tetrahedral sites at the time of charge, thereby forming a lithium trap and/or a lithium dumbbell structure, thereby providing effects of suppressing the structural change on the particle surface to improve the cycle-life characteristics at a high temperature and also of stably maintaining the crystalline structure even when emitting a large amount of lithium ions.

The invention claimed is:

1. A positive active material for a rechargeable lithium battery comprising lithium cobalt oxide particles,
   wherein the lithium cobalt oxide particles having dopants, wherein the dopants are Mg and Zr, wherein Zr is primarily included in the outer bulk, and Mg is mainly included in the inner bulk, and the Zr concentration of the outer bulk of a particle surface to 0.9*r is relatively higher than the Mg concentration of the inner bulk of 0.9*r to a particle center;
   the lithium cobalt oxide particles have a crystalline structure in which metal oxide layers (MO layers) including metals and oxygen and reversible lithium layers in which lithium ions move reversibly at the time of charge and discharge are repeatedly stacked, and
   the dopant and/or lithium ions move from octahedral sites to tetrahedral sites at the time of charge in a lattice configured by oxygen atoms of the MO layers adjacent to each other, thereby forming a lithium trap and/or a lithium dumbbell structure and providing structural stability at a high voltage of 4.5 V or greater.

2. The positive active material of claim 1, wherein the dopant is included in an amount of 0.001 to 1 wt % based on a total weight of the lithium cobalt oxide particles.

3. The positive active material of claim 1, wherein the lithium trap structure is a structure in which the lithium ions are disposed in tetrahedral sites at the time of charge in a lattice configured by oxygen atoms of a first MO layer and a second MO layer adjacent to each other.

4. The positive active material of claim 1, wherein the lithium dumbbell structure is a structure in which lithium ions are disposed in tetrahedral sites between a first MO layer and a second MO layer, and the dopants are disposed in tetrahedral sites between the second MO layer and a third MO layer at the time of charge in a lattice configured by oxygen atoms of the first MO layer, the second MO, and the third MO layer, so the lithium ions and the dopants are symmetrically disposed in a center of the second MO layer.

5. The positive active material of claim 1, wherein the positive active material comprises the lithium trap and the lithium dumbbell structure.

6. The positive active material of claim 1, wherein the positive active material comprises the lithium trap structure.

7. The positive active material of claim 1, wherein the lithium trap or the lithium dumbbell structure suppresses a phenomenon of relatively sliding of the MO layers by a repulsive force generated among metals of the MO layer, lithium of the tetrahedral site, and the dopants which are each cations, thus suppressing a structural change.

8. The positive active material of claim 1, wherein the lithium cobalt oxide particles further comprise at least one selected from the group consisting of Ca, Al, and Sb as a dopant.

9. The positive active material of claim 1, wherein the lithium cobalt oxide particles are further coated with protective chemicals, and
   the protective chemicals are at least one of a metal, an oxide, a phosphate salt, and a fluoride.

10. The positive active material of claim 9, wherein the protective chemicals are included at 0.02 wt % to 0.8 wt %.

11. The positive active material of claim 9, wherein the protective chemicals have a thickness of 30 nm to 250 nm.

12. The positive active material of claim 1, wherein the lithium cobalt oxide particles have a medium particle size (D50) of 5 micrometers to 25 micrometers.

13. A method of fabricating lithium cobalt oxide particles of a positive active material of claim 1, comprising:
   (a) mixing a cobalt precursor, a lithium precursor, and a Mg doping precursor and then firing the same to synthesize first doping particles;
   (b) coating a Zr doping precursor on a surface of the Mg doping particles; and (c) heat treating the coated Mg doping particles to synthesize Zr doping particles which are lithium cobalt oxide particles,
   wherein an amount of the dopant doped from the Zr doping precursor is greater than or equal to an amount of the dopant doped from the Mg doping precursor.

14. The method of claim 13, wherein the Mg doping precursor and the Zr doping precursor are independently a metal, a metal oxide, or a metal salt including Mg or Zr.

15. The method of claim 13, wherein the firing of the process (a) is performed at 900° C. to 1100° C. for 8 hours to 12 hours.

16. The method of claim 13, wherein the heat treatment of the process (c) is performed at 700° C. to 900° C. for 1 hour to 6 hours.

* * * * *